United States Patent [19]

Sullivan

[11] Patent Number: 4,852,884

[45] Date of Patent: Aug. 1, 1989

[54] USE OF METAL CARBAMATE ACCELERATOR IN PEROXIDE-CURED GOLF BALL CENTER FORMULATION

[75] Inventor: Michael J. Sullivan, Chicopee, Mass.

[73] Assignee: Spalding & Evenflo Companies, Inc., Tampa, Fla.

[21] Appl. No.: 137,647

[22] Filed: Dec. 24, 1987

[51] Int. Cl.$^4$ .............................................. A63B 37/06
[52] U.S. Cl. ........................ 273/230; 273/DIG. 022; 273/235 R; 524/197; 524/202; 524/322; 524/432; 525/259; 525/261
[58] Field of Search ............... 524/908, 197, 198, 202, 524/322, 432; 273/218, 228, 230; 525/261, 259

[56] References Cited

U.S. PATENT DOCUMENTS

| 4,266,772 | 5/1981 | Martin et al. | 524/430 |
| 4,483,537 | 1/1984 | Hanada et al. | 524/908 |
| 4,561,857 | 12/1985 | Tominaga et al. | 524/908 |
| 4,683,257 | 7/1987 | Kakiuchi et al. | 524/908 |

*Primary Examiner*—Allan M. Lieberman
*Attorney, Agent, or Firm*—Donald R. Bahr

[57] ABSTRACT

Golf balls exhibiting a satisfactory coefficient of restitution while having higher Riehle compression and hence a softer feel are provided by the inclusion of a metallic dithiocarbamate in the core formulation.

24 Claims, No Drawings

USE OF METAL CARBAMATE ACCELERATOR IN PEROXIDE-CURED GOLF BALL CENTER FORMULATION

This invention relates to improved golf balls. More particularly, this invention relates to improved core compositions for use in producing unitary golf balls.

In the prior art, it has become rather standard practice throughout the golfing industry to provide golf balls of unitary construction, generally consisting of a cover produced from ionomeric resins and a center part or core of cross-linked polybutadiene or other elastomers. Golf balls produced with such unitary construction are taught in U.S. Pat. No. 3,313,545, issued Apr. 11, 1967; U.S. Pat. No. 3,438,933, issued Apr. 15, 1969; and U.S. Pat. No. 4,625,964 issued Dec. 2, 1986.

A number of distinct advantages exist in the employment of unitary construction techniques in producing golf balls, as contrasted to the wound golf balls of the earlier art. Unitary golf balls can be produced with an essentially perfect center of gravity and, thus, exhibit excellent aerodynamic properties, superior roll and trueness of flight. Such golf balls are highly resistant to cutting and are practically indestructible during normal play. The balls return to round even after severe distortion and maintain their superior flight characteristics after extended use. Further, homogeneous unitary golf balls may be manufactured with better quality that the conventional wound balls.

In contrast to the covered wound golf balls, unitary balls maintain their playing characteristics throughout widely varying temperature ranges, possess an excellent shelf life and will not water log. In those situations where the paint on unitary golf balls becomes worn or damaged, the balls may be readily reclaimed by removing or stripping off the old paint, followed by repainting. By contrast, conventional wound balls seldom last long enought to allow repainting.

While such unitary golf balls have found wide acceptance, the advantages gained in increased durability have been offset to a large degree by decreased playability.

It is an object of the present invention to provide unitary golf balls exhibiting superior playability while maintaining a satisfactory coefficient of restitution.

In accordance with the present invention, there is provided a unitary golf ball comprising a solid core and a cover therefor, the solid core comprising polybutadiene and mixtures thereof, at least one metallic salt of an unsaturated carboxylic acid, a source of free radicals and from about 0.1 to about 0.5 parts by weight, based on 100 parts elastomer, of a polyvalent metal adduct of dialkyl dithiocarbamate, and the cover comprising at least one layer of an ionomeric resin-based composition.

The core compositions of the present invention may be based on polybutadiene, and mixtures of polybutadiene with other elastomers. It is preferred that the base elastomer have a relatively high molecular weight. The broad range for the molecular weight of suitable base elastomers is from about 50,00 to about 500,000. A more preferred range for the molecular weight of the base elastomer is from about 100,000 to about 500,000. As a base elastomer for the core composition, cis-polybutadiene is preferably employed, or a blend of cis-polybutadiene with other elastomers may also be utilized. Most preferably, cis-polybutadiene having a weight-average molecular weight of from about 100,000 to about 500,000 is employed.

The unsaturated carboxylic acid component of the core composition is the reaction product of the carboxylic acid and an oxide or carbonate of a metal such as zinc, magnesium, barium, calcium, lithium, sodium, potassium, cadmium, lead, tin and the like, and mixtures thereof. Preferably, the oxides of polyvalent metals, i.e., those having a valence of at least 2, and more preferably, oxides of divalent metals such as zinc, magnesium and cadmium are employed. Most preferably, zinc oxide is utilized.

Examples of unsaturated carboxylic acids which find utility in producing the present core compositions are acrylic acid, methacrylic acid, itaconic acid, crotonic acid, sorbic acid and the like, and mixtures thereof. Preferably, the carboxylic acid component is either acrylic or methacrylic acid. Usually, from about 20 to about 50, preferably from about 25 to about 35 parts by weight per 100 parts of elastomer, of the metal salt is included in the core composition.

The dithiocarbamate component of the core composition is selected from those compounds of the formula

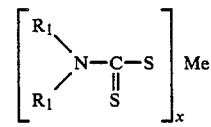

wherein $R_1$ is lower alkyl containing from 1 to about 5 carbon atoms, Me is a metallic cation having a valence of from 2 to 4, and x is an integer having a value equal to the valence of the cation.

Exemplary of $R_1$ are methyl, ethyl and butyl. Exemplary of suitable cations are zinc, lead, cadmium, tellurium, copper, bismuth and selenium. Preferably, the cation used is zinc and the carbamates are zinc dimethyl dithiocarbamate (methyl zimate) ethyl or butyl zimate. Most preferably, the carbamate is zinc dimethyl dithiocarbamate. As previously indicated, the metallic dithiocarbamate is included in the core composition in an amount of from about 0.1 to about 0.5 parts by weight per 100 parts elastomer, preferably in an amount of from about 0.1 to about 0.4.

The free radical initiator included in the core composition is any conventionally known polymerization initiator which decomposes during the cure cycle. The amount of the selected initiator present is dictated only by the requirements of catalytic activity as a polymerization initiator. Suitable initiators for use in the present invention include peroxides, persulfates, azo compounds, hydrazines and the like. Peroxides such as dicumyl peroxide, n-butyl 4,4-bis (butylperoxy) valerate, 1,1-bis (t-butylperoxy)-3,3,5-trimethylcyclohexane, di-t-butylperoxide and 2,5-di-(t-butylperoxy)-2,5 dimethylhexane are readily commercially available and conveniently used, generally in amounts of from about 0.1 to about 10.0 and preferably in amount of from about 0.3 to about 3.0 parts by weight based on 100 parts elastomer.

The core compositions of the present invention may additionally contain any other suitable and compatible modifying ingredients including, but not limited to, fillers, metal oxides, fatty acids, and diisocyanates.

As fillers, any known and conventional filler material, or mixtures thereof, may be used. Such fillers should be in finely divided form, as for example, in a size generally less than about 20 mesh and preferably less than about 100 mesh U.S. standard screen size. Suitable fillers include silica, silicates, zinc oxide, carbon black, cork, titania, cotton flock, cellulose flock, leather fiber, plastic and/or leather flour, asbestos, glass fibers, metal carbonates and talc. Particularly useful is the oxide or carbonate of the cation used in forming the metal salt of the unsaturated carboxylic acid component.

The amount of filler included in the core composition is primarily dictated by weight restrictions and is preferably from about 10 to about 100 parts by weight per 100 parts elastomer.

Fatty acids may also be included in the compositions, functioning to improve moldability and processing. Generally, fatty acids having from about 10 to about 40 carbon atoms are used, preferably those having from about 15 to about 20 atoms. Exemplary of suitable fatty acids are stearic acid and linoleic acid. When employed, the selected fatty acids, or mixtures thereof, are included in the core composition in amounts of from about 1 to about 15, more preferably in an amount of from about 2 to about 10, and most preferably in an amount of from about 2 to about 5 parts by weight based on 100 parts elastomer. It is preferred that the core compositions include stearic acid as the fatty acid adjunct in an amount of from about 2 to about 5 parts by weight based on 100 parts elastomer.

Diisocyanates may also be optionally included in the core compositions for the purpose of increasing the coefficient of restitution of resultant cores. When utilized, the diisocyanates are included in amounts of from about 0.2 to about 5.0 parts by weight based on 100 parts elastomer. Exemplary of a suitable diisocyanate is 4,4-diphenylmethane diisocyanate.

In producing golf ball cores utilizing the present compositions, the ingredients may be intimately mixed using, for example, two roll mills or a Banbury mixer until the composition is uniform, usually over a period of from about 5 to about 20 minutes. The sequence of addition of components is not critical. A preferred blending sequence is as follows.

Elastomer, filler, zinc salt, metal oxide, fatty acid and the metallic dithiocarbamate are blended for about 7 minutes in an internal mixer such as a Banbury mixer. As a result of shear during mixing the temperature rises to about 200° F. The initiator and diisocyanate are then added and the mixing continued until the temperature reaches about 220° F. whereupon the batch is discharged onto a two roll mill, mixed for about one minute and sheeted out.

The sheet is then placed in a Barwell preformer and slugs are produced. The slugs are then subjected to compression molding at about 320° F. for about 14 minutes. After molding and cooling, the cooling effected at room temperature for about 4 hours, the molded cores are subjected to a centerless grinding operation whereby a thin layer of the molded core is removed to produce a round core having a diameter of 1.545 inches.

The mixing is desirably conducted in such a manner that the composition does not reach incipient polymerization temperatures during the blending of the various components.

Usually the curable component of the composition will be cured by heating the composition at elevated temperatures on the order of from about 275° F. to about 350° F., preferably and usually from bout 295° F. to about 325° F., with molding of the composition effected simultaneously with the curing thereof. The composition can be formed into a core structure by any one of a variety of molding techniques, e.g., injection, compression or transfer molding. When the composition is cured by heating, the time required for heating will normally be short, generally from about 10 to about 20 minutes, depending upon the particular curing agent used. Those of ordinary skill in the art relating to free radical curing agents for polymers are conversant with adjustments of cure times and temperatures required to effect optimum results with any specific free radical agent.

After molding, the core is removed from the mold and the surface thereof, preferably treated to facilitate adhesion thereof to the covering materials. Surface treatment can be effected by any of the several techniques known in the art, such as corona discharge, ozone treatment, sand blasting and the like. Preferably, surface treatment is effected by grinding with an abrasive wheel.

The core is converted into a golf ball by providing at least one layer of covering material thereon, ranging in thickness from about 0.050 to about 0.250 inch and preferably from about 0.060 to about 0.090 inch. The cover composition preferably is made from ethylene-acrylic acid or ethylene-methacrylic acid copolymers neutralized with mono or polyvalent metals such as sodium, potassium, lithium, calcium, zinc or magnesium.

The ionic copolymers used to produce the cover compositions may be made according to known procedures, such as those in U.S. Pat. No. 3,421,766 or British Pat. No. 963,380, with neutralization effected according to procedures disclosed in Canadian Pat. Nos. 674,595 and 713,631, wherein the ionomer is produced by copolymerizing the olefin and carboxylic acid to produce a copolymer having the acid units randomly distributed along the polymer chain. The ionic copolymer comprises one or more alpha-olefins and from about 9 to about 15 weight percent of alpha, beta-ethylenically unsaturated mono- or dicarboxylic acid, the basic copolymer neutralized with metal ions to the extend desired.

At least about 18 percent of the carboxylic acid groups of the copolymer are neutralized by the metal ions, such as sodium, potassium, zinc, calcium, magnesium, and the like, and exist in the ionic state.

Suitable olefins for use in preparing the ionomeric resins include, but are not limited to, ethylene, propylene, butene-1, hexene-1 and the like. Unsaturated carboxylic acids include, but are not limited to acrylic, methacrylic, ethacrylic, alpha-chloroacrylic, crotonic, maleic, fumaric, itaconic acids and the like. Preferably, the ionomeric resin is a copolymer of ethylene with acrylic and/or methacrylic acid.

The covered golf ball can be formed in any one of the several methods known to the art. For example, the molded core may be placed in the center of a golf ball mold and the ionomeric resin-containing cover composition injected into and retained in the space for a period of time at a mold temperature of from about 40° F. to about 120° F.

Alternatively, the cover composition may be injection molded at about 300° F. to about 450° F. into smooth-surfaced hemispherical shells, a core and two such shells placed in a dimpled golf ball mold and unified at temperatures on the order of from about 100° F. to about 200° F.

The golf ball produced is then painted and marked, painting being effected by spraying techniques.

The invention is further described in the following examples wherein the parts are by weight unless otherwise specified.

EXAMPLES

Using the ingredients tabled below, golf ball cores having a finished diameter of 1.545 inches were produced by compression molding and subsequent removal of a surface layer by grinding. Each core was formulated using 100 parts high cis content polybutadiene. In the examples, the amounts of remaining ingredients are expressed in parts by weight, and the degrees of coefficient of restitution and compression achieved set forth. The data for each example represents the average data for twelve cores produced in the desired manner.

| Ingredients | EXAMPLES | | | | |
|---|---|---|---|---|---|
| | 1 | 2 | 3 | 4 | 5 |
| Zinc Diacrylate | 33.5 | 33.5 | 33.5 | 33.5 | 33.5 |
| Zinc Oxide | 5.5 | 5.5 | 5.0 | 5.0 | 5.0 |
| Stearic Acid | 5.0 | 5.0 | 5.0 | 5.0 | 5.0 |
| Ground Flash | 32 | 32 | 16 | 16 | 16 |
| 4,4'-diphenylmethane diisocyanate | 1.0 | 1.0 | 1.0 | 1.0 | 1.0 |
| n-Butyl 4,4-Bis-(Butylperoxide) Valerate | 1.5 | 1.5 | 2.0 | 2.0 | 2.0 |
| Methyl Zimate | — | 0.4 | — | — | 0.11 |
| Dodecanethiol | — | — | — | 0.6 | 0.6 |
| Weight gms. | 39.2 | 39.3 | 39.6 | 40.1 | 39.4 |
| Compression Riehle | .055" | .056" | .046" | .040" | .052" |
| Coefficient of Restitution | .802 | .803 | .808 | .811 | .807 |

| Ingredients | EXAMPLES | | | |
|---|---|---|---|---|
| | 6 | 7 | 8 | 9 |
| Taktene | 80 | 80 | 80 | 80 |
| BR-11 | 20 | 20 | 20 | 20 |
| Zinc Diacrylate | 31 | 31 | 31 | 31 |
| Ground Flash | 18 | 18 | 18 | 18 |
| Zinc Oxide | 17 | 17 | 17 | 17 |
| Zinc Stearate | 20 | 20 | 20 | 20 |
| n-Butyl 4,4-Bis-(Butylperoxide) Valerate | 0.75 | 0.75 | 0.75 | 0.75 |
| Methyl Zimate | — | 0.1 | 0.5 | 1.0 |
| Weight gms | 39.9 | 39.5 | 39.8 | 39.8 |
| Compression Riehle | .062" | .074" | .084 | .084 |
| Coefficient of Restitution | .805 | .805 | .788 | .776 |
| Size | 1.545 | 1.545 | 1.545 | 1.545 |

DISCUSSION OF THE EXAMPLES

The balls of examples 1, 3, 4 and 6 are controls in that they do not incorporate a metallic dithiocarbamate in accordance with this invention. In these examples the compressions are 0.055, 0.046, 0.040 and 0.062 inches respectively for an an average of 0.0508, while the coefficients of restitution are 0.802, 0.808, 0.811 and 0.805 respectively for an average of 0.8065. This data indicates that the balls of these examples have satisfactory coefficients of restitution, but that some better golfers may consider them to be hard. Generally, the harder the golf ball, the more difficult it is for a golfer to impart spin to the ball, and, hence, control the ball during play.

The golf balls of examples 2, 5, 7, 8 and 9 incorporate a metallic dithiocarbamate in accordance with this invention. As can be seen from the data of examples 2, 5, 7 and 8 when a metallic dithiocarbamate is used in accordance with this invention, balls having a very satisfactory coefficient of restitution are produced and yet the balls have significantly higher compressions, indicating that the balls would have a softer feel and, hence, are more readily deformed when struck by a golf club. This additional deformation allows a golfer to put more spin on a golf ball and, hence, impart better control to said golf ball.

As can be seen, the average coefficient of restitution for these golf balls is 0.8008 and the average compression is 0.0665. This data is to be compared with the control examples 1, 3, 4 and 6 where it can be seen that the average coefficient of restitution for these examples is 0.8065, and the average compression is 0.0508. This decrease of approximately 16 points in the compression as compared to the balls of this invention is very significant as a 16 point decrease would make the resultant golf balls much harder and, hence, more difficult to play. Example 9 demonstrates that when the metallic carbamate is in excessive amounts, the advantages of this invention are mitigated.

As can be seen, golf balls produced in accordance with the present invention maintain satisfactory coefficients of restitution at higher Riehle compressions, such that the resulting golf balls are softer and, hence, more playable.

It will be appreciated that the specification and examples are set forth by way of illustration and not limitation, and that various modifications and changes may be made without departing from the spirit and scope of the present invention.

What is claimed is:

1. An improved core composition for a golf ball exhibiting a high coefficient of restitution, said composition comprising an elastomer selected from polybutadiene and mixtures of polybutadiene with other elastomers, at least one metallic salt of an alpha,beta-ethylenically unsaturated monocarboxylic acid, a free radical initiator and a metallic dithiocarbamate having the formula:

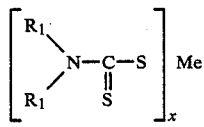

wherein R, is lower alkyl having from 1 to 5 carbon atoms, Me is a cation having a valence of from 2 to 4 and and x is an integer having a value equal to the valence of said cation, said dithiocarbamate present in said composition in an amount of from about 0.1 to about 0.5 parts by weight, based on 100 parts of said elastomer.

2. The composition as defined by claim 1 wherein said elastomer is cis-polybutadiene.

3. The composition as defined by claim 1 wherein said metallic salt is selected from the group consisting of metallic salts of acrylic, methacrylic, itaconic, crotonic and sorbic acids, and mixtures thereof.

4. The composition as defined by claim 3 wherein said metallic salt is zinc diacrylate.

5. The composition as defined by claim 1 wherein said free radical initiator is selected from the group consisting of peroxides, persulfates, hydrazines and azo compounds.

6. The composition as defined by claim 5 wherein said peroxide is selected from the group consisting of n-butyl-4,4-bis (butylperoxy) valerate, dicumyl peroxide, 1,1-bis (t-butylperoxy) 3,3,5-trimethylcyclohexane, di-t-butyl peroxide and 2,5-di (t-butylperoxy) 2,5-dimethylhexane.

7. The composition as defined in claim 1 wherein said dithiocarbamate is selected from the group consisting of zinc dimethyl dithiocarbamate, zinc diethyl dithiocarbamate, zinc di-n-butyl dithiocarbamate, zinc diamyl dithiocarbamate, tellurium diethyl dithiocarbamate, selenium dimethyl dithiocarbamate, selenium diethyl dithiocarbamate, lead diamyl dithiocarbamate, bismuth dimethyl dithiocarbamate, cadmium diethyl dithiocarbamate, and mixtures thereof.

8. The composition as defined by claim 7 wherein said dithiocarbamate is zinc dimethyl dithiocarbamate.

9. The composition as defined by claim 1 futher comprising a modifying ingredient selected from fillers, metal oxides, low molecular weight fatty acids, diisocyanates and mixtures thereof.

10. The composition as defined by claim 9 wherein said ingredient is stearic acid.

11. The composition as defined by claim 9 wherein said ingredient is 4,4-diphenylmethane diisocyante.

12. The composition as defined by claim 9 wherein said ingredient is zinc oxide.

13. A golf ball comprising a molded, spherical core and a cover therefor, said core comprising an elastomer selected from polybutadiene and mixtures of polybutadiene with other elastomers, said elastomer crosslinked with at least one metallic salt of an alpha,beta-ethylenically unsaturated monocarboxylic acid and from about 0.1 to about 0.5 parts by weight, based on 100 parts of said elastomer, of a metallic dithiocarbamate of the formula:

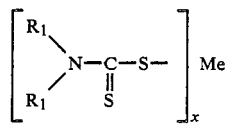

wherein $R_1$ is lower alkyl having from 1 to 5 carbon atoms, Me is a cation having a valence of from 2 to 4 and x is an integer having a value equal to the valence of said cation.

14. The golf ball as defined by claim 13 wherein said cover comprises an ionic copolymer of ethylene and an alpha, beta-ethylenically unsaturated monocarboxylic acid selected from the group consisting of acrylic and methacrylic acid wherein from about 20 to about 90 percent of the carboxylic acid groups are neutralized by a metal ion.

15. The golf ball as defined by claim 13 wherein said monocarboxylic acid is selected from the group consisting of acrylic acid, methacrylic acid, itaconic acid, crotonic acid, sorbic acid and mixtures thereof.

16. The golf ball as defined by claim 13 wherein crosslinking of said elastomer is effected by a free radical initiator.

17. The golf ball as defined by claim 16 wherein said initiator is a peroxide.

18. The golf ball as defined by claim 17 wherein said peroxide is selected from the group consisting of n-butyl-4,4-bis (butylperoxy) valerate, dicumyl peroxide, 1,1-bis (t-butylperoxy)-3,3,5-triethylcyclohexane, di-ti-butyl peroxide and 2,5-di (t-butylperoxy)-2,5-dimethylhexane.

19. The golf ball as defined by claim 13 wherein Me is selected from the group consisting of zinc, tellurium, selenium, lead, copper, bismuth and cadmium.

20. The golf ball as defined by claim 19 wherein said dithiocarbamate is zinc dithiocarbamate.

21. The golf ball as defined by claim 13 wherein said core further comprises a modifying ingredient selected from fillers, metal oxides, low molecular weight fatty acids, diisocyanates and mixtures thereof.

22. The golf ball as defined by claim 21 wherein said fatty acid is stearic acid.

23. The golf ball as defined by claim 21 wherein said diisocyanate is 4,4-diphenylmethane diisocyanate.

24. The golf ball as defined by claim 21 wherein said metal oxide is zinc oxide.

* * * * *